(12) United States Patent
Diazzi et al.

(10) Patent No.: US 11,274,925 B2
(45) Date of Patent: Mar. 15, 2022

(54) READOUT CIRCUIT FOR A MEMS GYROSCOPE AND METHOD FOR OPERATING SUCH A READOUT CIRCUIT

(71) Applicant: Robert Bosch GmbH, Stuttgart (DE)

(72) Inventors: Francesco Diazzi, Munich (DE); Andrea Visconti, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/064,993

(22) Filed: Oct. 7, 2020

(65) Prior Publication Data
US 2021/0108921 A1   Apr. 15, 2021

(30) Foreign Application Priority Data
Oct. 14, 2019   (DE) .......................... 102019215737.8

(51) Int. Cl.
  *G01C 19/5712*   (2012.01)
(52) U.S. Cl.
  CPC .................. *G01C 19/5712* (2013.01)
(58) Field of Classification Search
  CPC .................. G01C 19/5712; G01C 19/5776
  See application file for complete search history.

(56) References Cited

U.S. PATENT DOCUMENTS

| 9,506,757 | B2 | 11/2016 | Shaeffer et al. | |
| 2011/0121907 | A1 | 5/2011 | Kanai et al. | |
| 2014/0260713 | A1* | 9/2014 | Shaeffer | H03L 7/093 74/5.4 |
| 2016/0091339 | A1* | 3/2016 | Weinberg | G01C 19/5776 73/1.77 |
| 2017/0019087 | A1* | 1/2017 | Nicollini | H03H 11/18 |

\* cited by examiner

*Primary Examiner* — David J Bolduc
(74) *Attorney, Agent, or Firm* — Norton Rose Fulbright US LLP; Gerard Messina

(57) ABSTRACT

A readout circuit for a MEMS gyroscope having a seismic mass. The readout circuit includes: an analog amplitude-/phase-locked loop for monitoring the vibrating motion of the seismic mass and for generating a driver signal to excite and maintain a defined vibrating motion of the seismic mass, a selectively activatable sensing front end for providing measured values of the MEMS gyroscope, a selectively activatable phase-locked loop for providing a demodulation clock signal for the sensing front end, and an energy-management unit, which is designed to set a sensing operating mode for the MEMS gyroscope, in which measured values are acquired with the aid of the sensing front end, or to set a standby operating mode for the MEMS gyroscope, in which no measured values are acquired, the energy-management unit activating the sensing front end and the phase-locked loop in the sensing operating mode and deactivates them in the standby operating mode.

10 Claims, 2 Drawing Sheets

READOUT CIRCUIT FOR A MEMS GYROSCOPE AND METHOD FOR OPERATING SUCH A READOUT CIRCUIT

CROSS REFERENCE

The present application claims the benefit of German Patent Application No. DE 102019215737.8 filed on Oct. 14, 2019, which is expressly incorporated herein by reference in its entirety.

FIELD

The present invention relates to a readout circuit for a MEMS gyroscope having a seismic mass able to be excited into vibrating, and a method for operating such a readout circuit.

BACKGROUND INFORMATION

Conventional MEMS gyroscope units, hereinafter MEMS gyroscopes for short, are often used together with an acceleration sensor in an inertial measurement unit for portable terminal devices in order to permit applications in the area of augmented reality or for indoor navigation, for example. In this case, it is necessary to see to it that energy consumption is as low as possible. The energy consumption of a MEMS gyroscope is relatively high compared to the energy consumption of an acceleration sensor, since for detection purposes, the seismic mass of the sensor structure must be excited actively to vibrate in an excitation plane. Rotational movements of the sensor about an axis, which is oriented parallel to the excitation plane and perpendicular to the excitation direction, may then be detected as deflections of the seismic mass perpendicular to this excitation plane, since such rotational movements induce a Coriolis force which acts on the seismic mass in a direction perpendicular to the excitation plane. As a rule, the seismic mass of a MEMS gyroscope is set into resonant vibration. This vibrating motion is maintained constantly, since it takes a relatively long time to bring the seismic mass from a state of rest into a defined state of vibration again. This ensures that the sensor is always ready for measuring, even if measurement data are not to be acquired continuously. One known measure for reducing the energy consumption of a MEMS gyroscope is to switch the readout circuit of the MEMS gyroscope off when no measurement data are to be acquired, but to leave a driver circuit activated in order to maintain the vibrating motion or oscillations of the seismic mass.

Conventionally, a phase-locked loop is used in the driver circuit, the phase-locked loop having a low noise, since it is used not only to generate driver signals, but also to provide a digital clock signal for the sensing front end. This phase-locked loop contributes considerably to the energy consumption of the driver circuit, and therefore to the energy consumption of the MEMS gyroscope overall, as well, since the driver circuit is always activated in order to maintain the vibrating motion of the seismic mass.

U.S. Pat. No. 9,506,757 B2 describes a gyroscope system, including a MEMS gyroscope, which is coupled to a drive system and a sense system. The drive system maintains the MEMS gyroscope in a state of oscillation and the sense system in a state for receiving, amplifying and demodulating an output signal of the MEMS gyroscope that is indicative of its rate of rotation. The gyroscope system further includes a phase-locked loop PLL which receives a reference clock REFCLK from the drive system and produces a system clock CLK. In addition, the gyroscope system includes a controller which operates on the basis of the system clock and which sets an operating state of the drive system and the sense system and also an operating state of the phase-locked loop. In this case, one or more system-state variables are maintained in an essentially constant state during a so-called protect mode, thereby enabling rapid changes between a low-energy operating mode and a normal operating mode of the gyroscope system.

SUMMARY

In one specific embodiment, the present invention provides a readout circuit for a MEMS gyroscope having a seismic mass able to be excited into vibrating, including an analog amplitude-/phase-locked loop for monitoring the vibrating motion of the seismic mass and for generating a driver signal to excite and maintain a defined vibrating motion of the seismic mass, a selectively activatable sensing front end for providing measured values of the MEMS gyroscope, a selectively activatable phase-locked loop for providing a demodulation clock signal for the sensing front end, and an energy-management unit. The energy-management unit is designed to set an active sensing operating mode for the MEMS gyroscope, in which measured values are acquired with the aid of the sensing front end, or to set a standby operating mode for the MEMS gyroscope, in which no measured values are acquired, in that the energy-management unit activates the sensing front end and the phase-locked loop in the sensing operating mode and deactivates them in the standby operating mode, the analog amplitude-/phase-locked loop providing the driver signal for the MEMS gyroscope regardless of the operating mode of the MEMS gyroscope, and the analog amplitude-/phase-locked loop providing a clock signal for the energy-management unit.

In a further specific embodiment, the present invention provides a method for operating a readout circuit for a MEMS gyroscope having a seismic mass able to be excited into vibrating, including the steps of monitoring the vibrating motion of the seismic mass and generating a driver signal to excite and maintain a defined vibrating motion of the seismic mass with the aid of an analog amplitude-/phase-locked loop, providing a clock signal for an energy-management unit with the aid of the analog amplitude-/phase-locked loop, setting an active sensing operating mode or a standby operating mode for the MEMS gyroscope with the aid of the energy-management unit by activating or deactivating a sensing front end and a phase-locked loop, wherein in the sensing operating mode, measured values of the MEMS gyroscope are provided with the aid of the activated sensing front end, and a demodulation clock signal for the sensing front end is provided and a clock signal for a digital signal-processing unit for the measured values is provided with the aid of the activated phase-locked loop, the clock signal having a higher frequency than the driver signal, e.g., by at least the factor 2, preferably by at least the factor 5.

In other words, a readout circuit is provided which is operable in clocked fashion in alternating operating modes, the seismic mass of the MEMS gyroscope being maintained in constant motion with the aid of an exclusively analog amplitude-/phase-locked loop, regardless of the operating mode of the sensing front end, while the sensing front end, the phase-locked loop as well as a signal-processing unit are switched on or operated only when measurement data of the MEMS gyroscope are needed.

One of the advantages thereby attained is that the energy consumption of the MEMS gyroscope may be reduced significantly by the deactivation of the phase-locked loop in the standby operating mode, while the vibrating motion of the seismic mass is able to be maintained, uninfluenced by this. A further advantage is that independently of the phase-locked loop, thus, also in the standby operating mode, the analog amplitude-/phase-locked loop provides a clock signal for the energy-management unit, which may be used as time base for the change between sensing operating mode and standby operating mode. According to the invention, the phase-locked loop is only activated in the sensing operating mode in order to provide a demodulation clock signal for the activated sensing front end and possibly a clock signal for a signal-processing unit.

Further features, advantages and other specific embodiments of the present invention are described herein.

According to one advantageous further development of the present invention, the readout circuit is designed to detect the vibrating motion of the seismic mass in the form of a position signal varying over time, and to make it available as input signal to the phase-locked loop. Accordingly, in the case of this specific embodiment of the invention, the demodulation clock signal for the activated sensing front end and possibly the clock signal for a signal-processing unit is/are derived from the frequency of the vibrating motion of the seismic mass, particularly its resonant frequency.

According to a further advantageous development of the present invention, the analog amplitude-/phase-locked loop has an analog 90°-phase shifter, particularly in the form of an all-pass filter, for the detected position signal, and a downstream comparator which generates a clock signal for the energy-management unit from the position signal. In this case, the clock signal for the energy-management unit is thus also derived from the frequency of the vibrating motion of the seismic mass, particularly from its resonant frequency.

According to a further advantageous development of the present invention, the analog amplitude-/phase-locked loop includes an amplitude demodulation unit, which is supplied with the position signal and the clock signal in order to ascertain information about the amplitude of the vibrating motion of the seismic mass, an analog control unit, particularly in the form of a PD controller or a PID controller, for controlling the amplitude of the vibrating motion of the seismic mass being located downstream of the amplitude demodulation unit, and the analog amplitude-/phase-locked loop being designed to modulate the output signal of the control unit with the clock signal, in order to produce the driver signal for the seismic mass. The advantage of this is that an amplitude-controlled and phase-controlled driver signal may thus be produced for the MEMS gyroscope in completely analog fashion and without the help of the phase-locked loop.

According to another advantageous development of the present invention, the vibrating motion of the seismic mass is detected capacitively. In this case, the analog amplitude-/phase-locked loop includes a capacitance-to-voltage converter for the capacitive position signal. The output of this capacitance-to-voltage converter is supplied to the phase-locked loop, the analog 90°-phase shifter and the amplitude demodulation unit. At this point, it should be noted that the vibrating motion of the seismic mass could also be detected in a different manner, e.g., piezoelectrically or piezoresistively. A different converter element would then replace the capacitance-to-voltage converter.

According to a further advantageous development of the present invention, the digital energy-management unit is designed to use the clock signal as time base for the change between sensing operating mode and standby operating mode of the MEMS gyroscope. As already mentioned, in this variant, the time base for the energy-management unit is derived from the frequency of the vibrating motion of the seismic mass, particularly from its resonant frequency.

According to another advantageous development of the present invention, the readout circuit has a selectively activatable digital signal-processing unit for the measured values of the MEMS gyroscope provided by the sensing front end. The energy-management unit is designed here to activate the digital signal-processing unit in the sensing operating mode and to deactivate it in the standby operating mode. In addition, the phase-locked loop is designed to provide a clock signal for the digital signal-processing unit which has a higher frequency than the driver signal, e.g., by at least the factor 2, preferably by at least the factor 5.

Further important features and advantages of the present invention may be derived from the figures and from the description herein.

It should be understood that the features indicated above and the features yet to be explained in the following are usable not only in the combination indicated in each instance, but also in other combinations or singularly without departing from the scope of the present invention.

Preferred implementations and specific embodiments of the present invention are represented in the drawing and explained in greater detail in the following description, with identical reference numerals referring to identical or similar or functionally identical components or elements.

DETAILED DESCRIPTION OF EXAMPLE EMBODIMENTS

Figure 1:
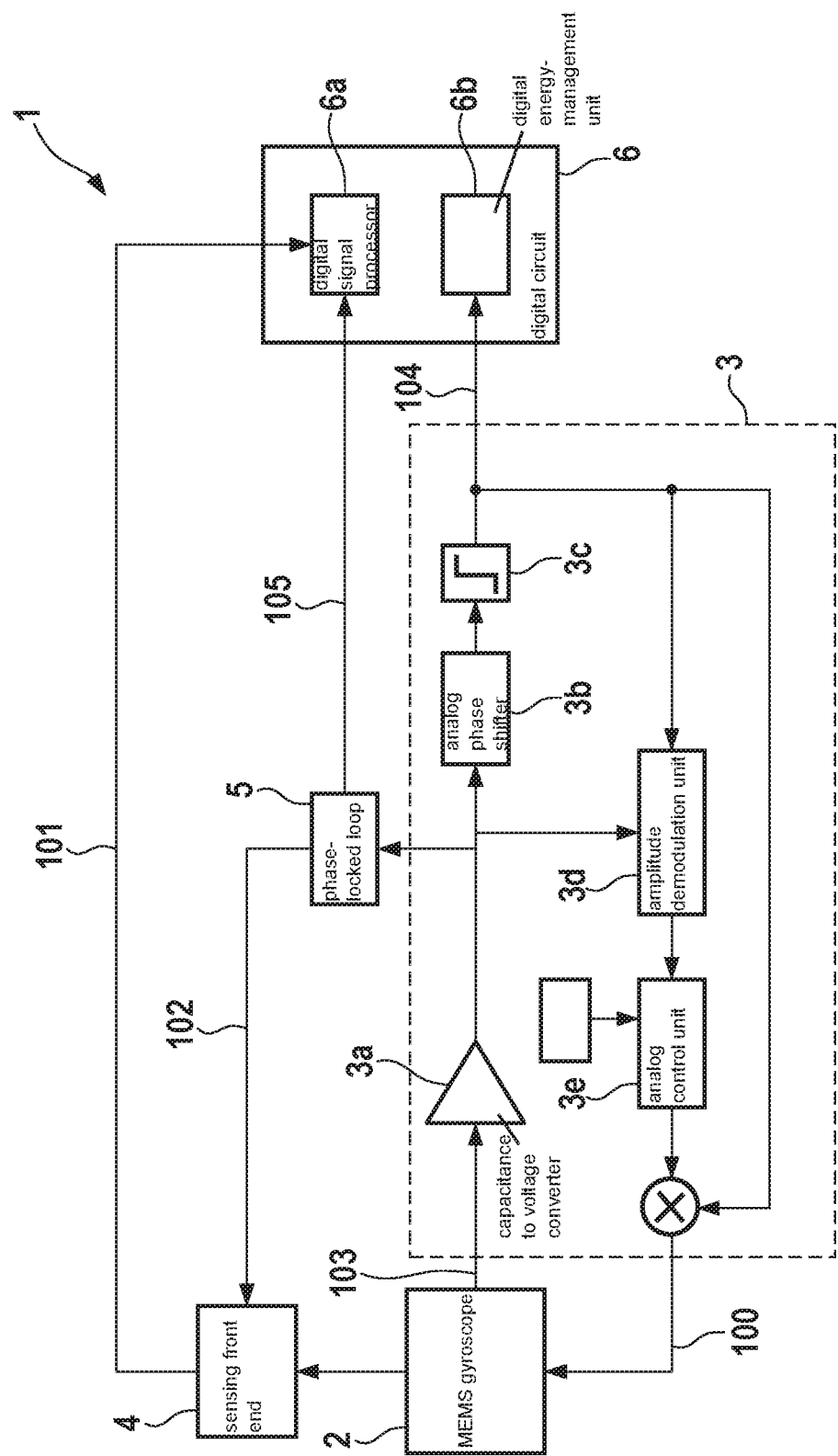
FIG. 1 shows a readout circuit for a MEMS gyroscope according to one specific embodiment of the present invention.

FIG. 1 shows a gyroscope system 1 in detail. Gyroscope system 1 includes a MEMS gyroscope 2 having a seismic mass able to be excited into vibrating. MEMS gyroscope 2 is connected to an analog amplitude-/phase-locked loop 3 and a sensing front end 4. Analog amplitude-/phase-locked loop 3 receives position signals 103 from MEMS gyroscope 2, e.g., in the form of changes in capacitance which represent the vibrating motion of the seismic mass, and supplies a driver signal 100 to MEMS gyroscope 2 in order to excite and maintain a defined vibrating motion of the seismic mass, namely, with defined frequency and amplitude. For reasons of energy efficiency, the seismic mass is usually excited into resonant vibration. MEMS gyroscope 2 detects the rate of rotation of a rotational movement and makes corresponding measuring signals 101 available with the aid of sensing front end 4. They are supplied to a digital signal processor 6a, which is part of a digital circuit 6. It also includes a digital energy-management unit 6b for gyroscope system 1.

As explained above, with the aid of analog amplitude-/phase-locked loop 3, a defined vibrating motion of the seismic mass of MEMS gyroscope 2 is excited or maintained with constant amplitude. In the exemplary embodiment represented here, the vibrating motion, thus, the position of the seismic mass of MEMS gyroscope 2, is detected capacitively. Corresponding position signals 103 are fed to a capacitance-to-voltage converter 3a of analog amplitude-/phase-locked loop 3 and converted into a corresponding voltage signal. The sinusoidal output signal of capacitance-to-voltage converter 3a is passed on to an analog phase shifter 3b and an amplitude demodulation unit 3d, which is likewise part of amplitude-/phase-locked loop 3. Analog phase shifter 3b shifts the phase of the voltage signal by 90°. Phase shifter 3b may be provided in the form of an all-pass filter, for example. The voltage signal, phase-shifted by 90°, is then converted by a comparator 3c into a rectangular clock signal 104. On one hand, this clock signal 104 is then supplied to amplitude demodulation unit 3d, and on the other hand, this clock signal 104 is also made available to digital energy-management unit 6b. With the aid of amplitude demodulation unit 3d, the amplitude information of the voltage signal output by capacitance-to-voltage converter 3a is made available again. To that end, for example, amplitude demodulation unit 3d may sample the sinusoidal voltage signal and particularly its extrema and/or may use a mixer. The amplitude information thus ascertained is provided to an analog control unit 3e, which regulates the amplitude of the vibrating motion to a reference value Ref. Usually it is a temperature-independent reference voltage, which corresponds to a predetermined setpoint amplitude. Control unit 3e may operate either in proportional manner or in proportional-integrative manner. The signal output by analog control unit 3e is a DC-voltage signal which is then modulated with the aid of the clock signal output by comparator 3c, in order to obtain a corresponding maximum energy input via the usually existing driver electrodes, to the seismic mass of MEMS gyroscope 2.

As mentioned above, clock signal 104 is also supplied to energy-management unit 6b, which uses this clock signal 104 as time base for a user-defined automatic switching on and off of the measuring function of gyroscope system 1, also known as "duty-cycling." In the exemplary embodiment described here, gyroscope system 1 is operable either in an active sensing operating mode, in which measuring signals are detected and processed, or in a standby operating mode, in which no measuring signals are detected. Energy-management unit 6b sets the specific operating mode by activating sensor front end 4, a phase-locked loop 5 and digital signal processor 6a for the sensing operating mode, and deactivating them for the standby operating mode. The activation and deactivation are accomplished with the aid of a control signal 106, which is also clarified by FIG. 2. Unaffected by this, amplitude-/phase-locked loop 3 is always supplied with energy. It is always active in order to maintain the vibrating motion of the seismic mass of MEMS gyroscope 2 regardless of the operating mode, and to generate a clock signal 104 as time base for energy-management unit 6b, regardless of the operating mode.

The output signal of capacitance-to-voltage converter 3a is supplied to phase-locked loop 5 which, derived therefrom, generates first of all a demodulation clock signal 102 with low noise for sensing front end 4, and secondly a high-frequency clock signal 105, usually above 1 MHz, for signal processor 6a. This is associated with relatively high energy consumption, but only takes place in the sensing operating mode, since phase-locked loop 5 is deactivated in the standby operating mode.

Sensing front end 4 converts the measuring signal of MEMS gyroscope 2 into a digital signal 101 for digital signal processor 6a, utilizing demodulation clock signal 102. For example, digital signal processor 6a may then filter digital sensor signal 101, carry out a temperature compensation and or make a correction to the data in terms of offset or gain.

Figure 2:
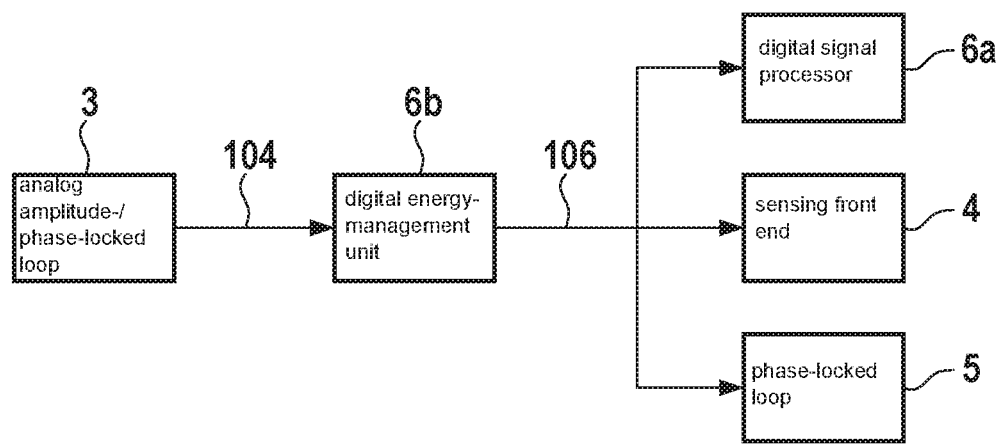
FIG. 2 shows a block diagram for illustrating the operating method of an energy-management unit according to one specific embodiment of the present invention.

The manner of functioning or the operation of the readout circuit, described in connection with FIGS. 1 and 2, for a MEMS gyroscope 2 is explained in the following.

The vibrating motion of the seismic mass of MEMS gyroscope 2 is monitored continuously so as, by generating a suitable driver signal 100, to excite or maintain a defined vibrating motion, and specifically, regardless of the respective operating mode of gyroscope system 1. Driver signal 100 is generated with the aid of analog amplitude-/phase-locked loop 3.

Likewise regardless of the specific operating mode of gyroscope system 1, amplitude-/phase-locked loop 3 generates a clock signal 104 as time base for energy-management unit 6b. Energy-management unit 6b sets the operating mode of gyroscope system 1, namely, either an active sensing operating mode or a standby operating mode, by activating or deactivating sensing front end 4, phase-locked loop 5 as well as digital signal processor 6a.

In the sensing operating mode, activated sensing front end 4 generates a digitized sensor signal 101 from the sensor signal detected by MEMS gyroscope 2. For that, activated phase-locked loop 5 generates a demodulation clock signal 102 and provides it to sensing front end 4. In addition, phase-locked loop 5 generates a high-frequency clock signal 105 for digital signal-processing unit 6a, to which digital sensor signal 101 is forwarded for further signal processing.

The measures according to the present invention described above permit a considerable reduction in the energy consumption of a MEMS gyroscope in "duty cycling" operation, even without switching off the drive circuit or driver circuit for the seismic mass. According to the invention, the driver circuit is realized in the form of a purely analog amplitude-/phase-locked loop. In addition to the driver signal for the MEMS gyroscope, it also supplies a clock signal as time base for the energy-management unit, which is derived from the vibration frequency of the seismic mass. Generally, this is the resonant frequency, which normally lies in the range of 20 kHz to 50 kHz. The noise demands on the demodulation clock signal for the sensing front end are relatively high, that is, it may only be tainted with very little noise. That is why the energy consumption of the phase-locked loop, which supplies this demodulation clock signal, is relatively high. According to the present invention, this phase-locked loop is therefore only activated in the sensing operating mode when measured values are actually to be acquired and retrieved.

Although the present invention is described herein on preferred exemplary embodiments, it is not limited to them, but rather is modifiable in a variety of ways.

What is claimed is:

1. A readout circuit for a MEMS gyroscope having a seismic mass able to be excited into vibrating, the readout circuit comprising:
   a first loop which is an analog loop that is amplitude locked and phased locked configured to monitor a vibrating motion of the seismic mass and to generate a driver signal to excite and maintain a defined vibrating motion of the seismic mass;
   a selectively activatable sensing front end configured to provide measured values of the MEMS gyroscope;
   a second loop which is a selectively activatable phase-locked loop configured to provide a demodulation clock signal for the sensing front end; and an energy-management unit configured to set an active sensing operating mode for the MEMS gyroscope, in which measured values are acquired, and to set a standby operating mode for the MEMS gyroscope, in which no measured values are acquired, the energy-management unit configured to activate the sensing front end and the second loop in the active sensing operating mode and to deactivate the sensing front end and the second loop in the standby operating mode;

wherein the first loop is configured to provide the driver signal for the MEMS gyroscope regardless of an operating mode of the MEMS gyroscope, and the first loop is configured to provide a clock signal for the energy-management unit.

2. The readout circuit as recited in claim 1, wherein the readout circuit is configured to detect the vibrating motion of the seismic mass as a position signal varying over time, and to provide the position signal as an input signal to the second loop.

3. A readout circuit for a MEMS gyroscope having a seismic mass able to be excited into vibrating, the readout circuit comprising:

a first loop which is an analog loop that is amplitude locked and phased locked configured to monitor a vibrating motion of the seismic mass and to generate a driver signal to excite and maintain a defined vibrating motion of the seismic mass;

a selectively activatable sensing front end configured to provide measured values of the MEMS gyroscope;

a second loop which is a selectively activatable phase-locked loop configured to provide a demodulation clock signal for the sensing front end; and an energy-management unit configured to set an active sensing operating mode for the MEMS gyroscope, in which measured values are acquired, and to set a standby operating mode for the MEMS gyroscope, in which no measured values are acquired, the energy-management unit configured to activate the sensing front end and the second loop in the active sensing operating mode and to deactivate the sensing front end and the second loop in the standby operating mode;

wherein the first loop is configured to provide the driver signal for the MEMS gyroscope regardless of an operating mode of the MEMS gyroscope, and the first loop is configured to provide a clock signal for the energy-management unit, wherein the readout circuit is configured to detect the vibrating motion of the seismic mass as a position signal varying over time, and to provide the position signal as an input signal to the second loop, wherein the first loop has an analog 90°-phase shifter in a form of an all-pass filter for the detected position signal, and a downstream comparator which generates the clock signal from the position signal.

4. The readout circuit as recited in claim 3, wherein the first loop includes an amplitude demodulation unit which is supplied with the position signal and the clock signal to ascertain information about an amplitude of the vibrating motion of the seismic mass, an analog control unit in a form of a PD controller or a PID controller configured to control the amplitude of the vibrating motion of the seismic mass being located downstream of the amplitude demodulation unit, and the first loop being configured to modulate the output signal of the control unit with the clock signal to produce the driver signal (100).

5. The readout circuit as recited in claim 4, wherein the vibrating motion of the seismic mass is detected capacitively, the first loop including a capacitance-to-voltage converter for a capacitive position signal, and an output of the capacitance-to-voltage converter being supplied to the second loop, the analog 90°-phase shifter, and the amplitude demodulation unit.

6. The readout circuit as recited in claim 1, wherein the digital energy-management unit is configured to use the clock signal as a time base for a change between the active sensing operating mode and the standby operating mode of the MEMS gyroscope.

7. A readout circuit for a MEMS gyroscope having a seismic mass able to be excited into vibrating, the readout circuit comprising:

a first loop which is an analog loop that is amplitude locked and phased locked configured to monitor a vibrating motion of the seismic mass and to generate a driver signal to excite and maintain a defined vibrating motion of the seismic mass;

a selectively activatable sensing front end configured to provide measured values of the MEMS gyroscope;

a second loop which is a selectively activatable phase-locked loop configured to provide a demodulation clock signal for the sensing front end; and an energy-management unit configured to set an active sensing operating mode for the MEMS gyroscope, in which measured values are acquired, and to set a standby operating mode for the MEMS gyroscope, in which no measured values are acquired, the energy-management unit configured to activate the sensing front end and the second loop in the active sensing operating mode and to deactivate the sensing front end and the second loop in the standby operating mode;

wherein the first loop is configured to provide the driver signal for the MEMS gyroscope regardless of an operating mode of the MEMS gyroscope, and the first loop is configured to provide a clock signal for the energy-management unit, a selectively activatable digital signal-processing unit for the measured values of the MEMS gyroscope provided by the sensing front end, the energy-management unit being configured to activate the digital signal-processing unit in the active sensing operating mode and to deactivate the digital signal-processing unit in the standby operating mode, and the second loop being configured to provide a clock signal for the digital signal-processing unit which has a higher frequency than the driver signal.

8. The readout circuit as recited in claim 7, wherein the clock signal provided by the second loop has a higher frequency than the driver signal by at least a factor 2.

9. The readout circuit as recited in claim 7, wherein the clock signal provided by the second loop has a higher frequency than the driver signal by at least the factor 5.

10. A method for operating a readout circuit for a MEMS gyroscope having a seismic mass able to be excited into vibrating, the method comprising the following steps:

monitoring a vibrating motion of the seismic mass and generating a driver signal to excite and maintain a defined vibrating motion of the seismic mass using a loop which is an analog loop that is amplitude locked and phased locked;

providing a clock signal for an energy-management unit using the first loop;

setting an active sensing operating mode or a standby operating mode for the MEMS gyroscope using the energy-management unit by activating or deactivating a sensing front end and a second loop which is a selectively activatable phase-locked loop; and in the active sensing operating mode:

providing measured values of the MEMS gyroscope using the activated sensing front end, and providing a demodulation clock signal for the sensing front end and providing a clock signal for a digital signal-processing unit for the measured values using the second loop, the clock signal having a higher frequency than the driver signal.

\* \* \* \* \*